US012406805B2

(12) United States Patent
Hanrahan et al.

(10) Patent No.: US 12,406,805 B2
(45) Date of Patent: Sep. 2, 2025

(54) DIELECTRIC CAPACITOR FORMED OF A DIELECTRIC-COATED ELECTRICALLY CONDUCTIVE POROUS SCAFFOLD FILLED WITH METAL

(71) Applicant: U.S. Army DEVCOM, Army Research Laboratory, Adelphi, MD (US)

(72) Inventors: Brendan M. Hanrahan, Silver Spring, MD (US); Nathan S. Lazarus, Bear, DE (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 17/893,350

(22) Filed: Aug. 23, 2022

(65) Prior Publication Data

US 2024/0079183 A1    Mar. 7, 2024

(51) Int. Cl.
*H01G 4/005*     (2006.01)
*H01G 4/008*     (2006.01)

(52) U.S. Cl.
CPC ............. *H01G 4/005* (2013.01); *H01G 4/008* (2013.01)

(58) Field of Classification Search
CPC ......... H01G 4/005; H01G 4/008; H01G 5/012
See application file for complete search history.

(56) References Cited

U.S. PATENT DOCUMENTS

| | | | | | |
|---|---|---|---|---|---|
| 3,175,135 | A | * | 3/1965 | Coenraads | H01G 5/16 361/278 |
| 4,450,500 | A | * | 5/1984 | Wollenschlager | H01G 5/00 361/327 |
| 5,162,972 | A | * | 11/1992 | Gripshover | H01G 5/0132 361/327 |
| 2009/0268371 | A1 | | 10/2009 | Histitani et al. | |
| 2010/0025817 | A1 | * | 2/2010 | Mihara | H10B 53/30 257/532 |

(Continued)

FOREIGN PATENT DOCUMENTS

| | | | | |
|---|---|---|---|---|
| CN | 202796464 U | * | 3/2013 | |
| CN | 108269689 A | * | 7/2018 | ............. H01G 5/012 |
| CN | 111864183 A | * | 10/2020 | ............. H01G 11/86 |
| JP | 2009135359 A | * | 6/2009 | |
| KR | 20110118107 A | * | 10/2011 | |
| WO | 2012144993 | | 10/2012 | |

OTHER PUBLICATIONS

M. Fish, A. Wilson, B. Hanrahan and C. Pullen, "Gallium Infiltration of Porous Metal Foams," 2021 20th IEEE Intersociety Conference on Thermal and Thermomechanical Phenomena in Electronic Systems (iTherm), San Diego, CA, USA, 2021, pp. 301-307, doi: 10.1109/ITherm51669.2021.9503153.

(Continued)

*Primary Examiner* — David M Sinclair (74) *Attorney, Agent, or Firm* — Eric B. Compton (57) ABSTRACT

Novel dielectric capacitor devices include an electrically conductive porous scaffold forming a first conductor, a conformal thin dielectric uniformly coating the pores, and a metal or alloy which fills the conformal dielectric coated pores of the scaffold forming a second conductor. This structure's design provides high surface area for high energy storage and capacitance density as well as high thermal conductivity. The metal or alloy can be a liquid metal and flowed within the device to change the electrical or mechanical properties of the device.

24 Claims, 7 Drawing Sheets

(56) References Cited

U.S. PATENT DOCUMENTS

| | | |
|---|---|---|
| 2017/0025683 A1 | 1/2017 | Park et al. |
| 2017/0051420 A1 | 2/2017 | Botrel |
| 2017/0325359 A1* | 11/2017 | Lazarus ............... H05K 1/0272 |

OTHER PUBLICATIONS

Nicholas A. Strnad et al., "Growth of thin film ferroelectric PZT, PHT, and antiferroelectric PHO from atomic layer deposition precursors," J Am Ceram Soc. 2021;104:1216-1228, available online at: https://ceramics.onlinelibrary.wiley.com/doi/full/10.1111/jace.17521.

Nickel Foam for Battery Cathode Substrate—EQ-bonf-16 webpage, MTI Corporation, available at: https://www.mtixtl.com/NickelFoamforBatteryCathodeSubstrate1mlengthx300mmwidthx1.6mm.aspx. MTI Corporation (@ 1994-2022 MTI Corporation).

Aluminium Foam | Properties and applications webpage, GoodFellow Material Hub, available at: https://www.materialshub.com/material/aluminium-foam/ (Accessed Aug. 22, 2022).

Nickel Sponge product information, American Elements, available at: https://www.americanelements.com/nickel-sponge-7440-02-0 (Accessed Jul. 27, 2022).

Nickel Foam Prices, Alibaba, available at: https://www.alibaba.com/showroom/nickel-foam-price.html (Accessed Jul. 27, 2022).

Alexis Payne et al., "Dielectric, energy storage, and loss study of antiferroelectric-like Al-doped HfO2 thin films," Appl. Phys. Lett. 117, 221104 (2020).

Alexis Leilani Payne, "A Characterization Platform for 3D Ferroelectric Thin Films," PhD Dissertation, Material Science and Engineering, North Carolina State University (NCSU), 2021, available online at: https://repository.lib.ncsu.edu/bitstream/handle/1840.20/39059/etd.pdf.

Francisco García-Moreno, "Commercial Applications of Metal Foams: Their Properties and Production," Materials (Basel). Feb. 2016; 9(2): 85.

Yuzhen Xia, et al., "Enhanced Water Management of High-Surface-Density Ni Foam as Flow Field for PEM Fuel Cells," Int. J. Electrochem. Sci., 17 (2022).

Presentation tilted "A Capacitor Consisting of Metal Foam, ALD-Dielectric, and Liquid Metal" given by inventor Dr. Brendan Hanrahan at the 2022 International Symposium on Applications of Ferroelectrics (ISAF) in Tours, France on Jun. 29, 2022. A video of presentation posted on YouTube at: https://www.youtube.com/watch?v=BigdBm3InNg on Jul. 11, 2022.

* cited by examiner

DIELECTRIC CAPACITOR FORMED OF A DIELECTRIC-COATED ELECTRICALLY CONDUCTIVE POROUS SCAFFOLD FILLED WITH METAL

GOVERNMENT INTEREST

The invention described herein may be manufactured, used and licensed by or for the U.S. Government without the payment of royalties thereon.

BACKGROUND OF THE INVENTION

Field

Embodiments of the present invention are directed to dielectric capacitors, and more particularly, to dielectric capacitors formed of a dielectric-coated electrically conductive porous scaffold filled with metal.

Description of Related Art

The capacitor is a basic circuit component and a short-term energy storage device. Dielectric capacitors are a type of capacitor typically comprised of two metal plates separated by an insulating dielectric material where a dielectric material is one that becomes polarized under the presence of an electric field. The most common dielectrics are ceramics, polymers, and oil-based fluids.

The main challenges with dielectric capacitors are 1) size and 2) thermal/heat issues. To increase capacitance of dielectric capacitors many layers are normally stacked or rolled up. These devices unfortunately have issues with reliability because the voltage is applied in the same directions around the device, so they pulse subtly. Dielectric capacitors are also prone to overheating and are typically cooled with external heat exchangers.

Improvements are desired.

BRIEF SUMMARY OF THE INVENTION

Embodiments of the present invention are directed to novel dielectric capacitors formed of a dielectric-coated electrically conductive porous scaffold filled with metal, and methods of manufacturing and using the same.

The novel dielectric capacitor devices include an electrically conductive porous scaffold forming a first conductor, a conformal thin dielectric uniformly coating the pores, and a metal or alloy which fills the conformal dielectric coated pores of the scaffold forming a second conductor. This structure's design provides high surface area for high energy storage and capacitance density as well as high thermal conductivity. The metal or alloy can be a liquid metal and flowed within the device to change the electrical or mechanical properties of the device.

The electrically conductive porous scaffold may be an open pore foam, sponge, woolen material, or 3D printed open pore scaffolding, for instance. Porosity may be reported in different ways. For instance, the uncoated electrically conductive porous scaffold can have a porosity of about 80-97% It may have an average pore size of approximately 0.01-0.25 mm, for instance. More, the uncoated electrically conductive porous scaffold can have a surface density of about 350-1500 $g/m^2$ or more, as a non-limiting example. The uncoated electrically conductive porous scaffold can be formed of various electrically conductive materials. These could include metals like nickel (Ni), aluminum (Al), or copper (Cu), or electrically conductive carbon (C), like graphene, for example.

The dielectric material can be a ferroelectric or antiferroelectric material. The dielectric materials can include various glasses, ceramics, or refractory metal compounds. Exemplary dielectric materials for conformally coating can include alumina ($Al_2O_3$), zirconium oxide ($ZrO_2$), hafnia ($HfO_2$), aluminum-doped hafnia ($Al:HfO_2$), lead hafnium oxide ($PbHfO_3$), lead zirconium oxide ($PbZrO_3$), lead titanium oxide ($PbTiO_3$), lead hafnate titanate ($PbHf_xTi_{1-x}O_3$), lead zirconate titanate ($PbZr_xT_{1-x}O_3$), or any combinations thereof. As applied, the dielectric material can have a conformal thickness of about 20-200 nm on the electrically conductive porous scaffold, for instance. The coated dielectric material may be selected to have a dielectric constant between about 20 to 400 and breakdown field up to about 8 MV/cm in various implementations.

The metal or alloy is preferably liquid at or near room temperature (25° C.). For instance, it may be a liquid eutectic metal, such as mercury, gallium, EGaIn or galinstan. Higher melting point metals and alloys, like aluminum, could also be used, but would need to be melted to fill the coated scaffold.

The capacitor preferably can also include a protective cover to provide mechanical support and prevent shorting of the device. The cover may be molded or casted from various dielectric or electrically insulating materials as generally known in the art for these purposes.

The capacitance of the capacitor may be between 1μ to 1 m F and the rated voltage of a few volts to about 100 volts. It can be a bi-polar dielectric capacitor.

The novel dielectric capacitors may be fabricated from an open-pore foam or sponge, e.g., a porous substrate, that has been coated with a high electrical resistance, dielectric film using a technique that provides conformal deposition like atomic-layer deposition or other vapor-phase techniques. The dielectric coated scaffold is then filled with a metal or alloy that can either solidify or remain a liquid. Also, the use of a liquid metal electrode is new and provides many new features like liquid cooling or tunability. This novel technology can help shrink these systems and improve their efficiency by combining the thermal and electrical requirements into a single device.

We further provide a method for forming the dielectric capacitor. This includes providing or forming an electrically conductive porous scaffold; conformally coating the electrically conductive porous scaffold with a dielectric material; and filling at least a portion of the porous space of the dielectric-coated porous scaffold with a metal or metal alloy.

The porous scaffold is preferably cleaned before coating it with the dielectric material. This can be achieved with various mechanical and/or chemical treatments. Conformally coating the porous scaffold with a dielectric material can be accomplished by atomic layer deposition (ALD), chemical vapor deposition (CVD), reactive thermal treatments, or liquid-phase processing. After coating, the method may further comprise annealing the dielectric-coated porous scaffold, such as at temperature of at least 500° C. in $N_2$ for about 1 minute. Filling at least a portion of the porous space of the dielectric-coated porous scaffold with the liquid metal or alloys can be achieved using a centrifuge or by submersion in a metal bath, for instance. The method can further comprise connecting a first electrode contact to the electrically conductive porous scaffold before it is conformally coated with the dielectric material; and connecting a second electrode contact to the metal or alloy at least partially filling the porous space of the dielectric coated porous scaffold.

The novel dielectric capacitors also readily provide for cooling in certain embodiments. This includes flowing the metal or alloy through a heat exchanger or melting the metal or alloy. Also, novel dielectric capacitors can be configured as a variable capacitor, in which the capacitance of the capacitor can easily be changed. This may include removing metal or alloy from and/or adding metal or alloy to the capacitor.

These and other embodiments of the invention are described in more detail, below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments, including less effective but also less expensive embodiments which for some applications may be preferred when funds are limited. These embodiments are intended to be included within the following description and protected by the accompanying claims.

DETAILED DESCRIPTION

Figure 1:
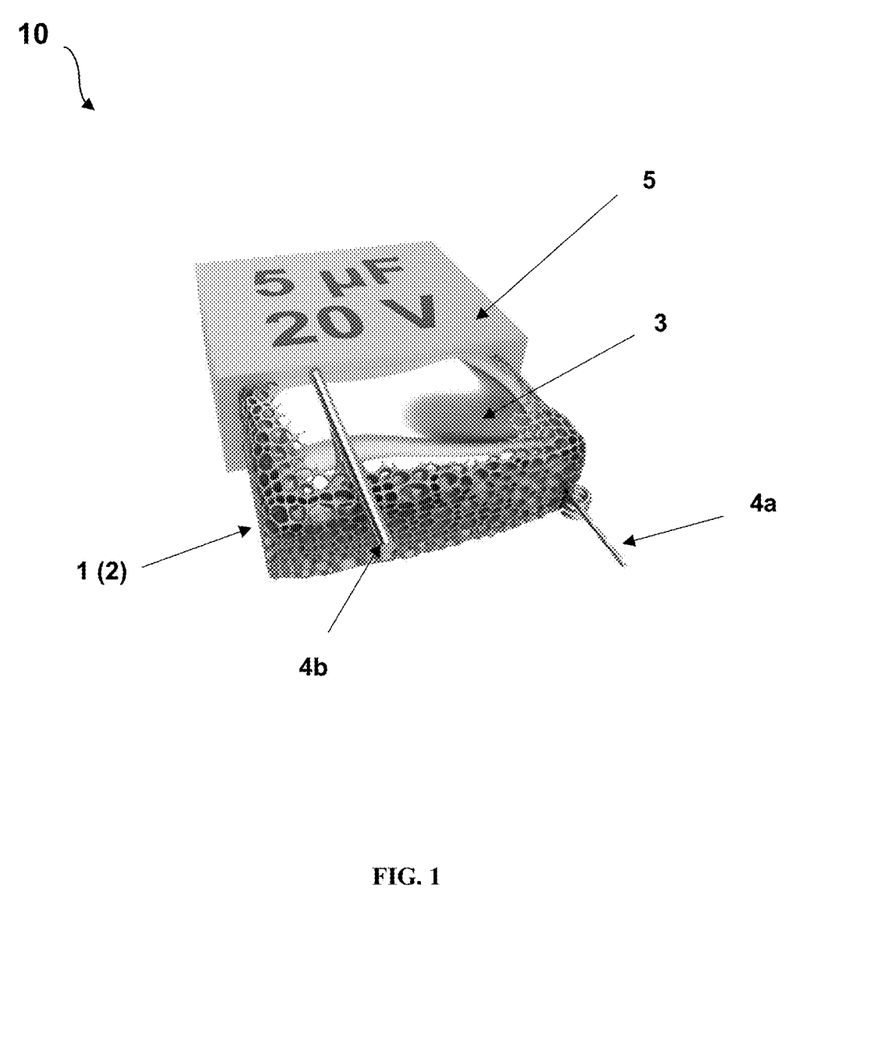
FIG. 1 is a schematic illustration of a novel dielectric capacitor formed of a dielectric-coated electrically conductive porous scaffold filled with metal according to an embodiment of the present invention.

FIG. 1 is a schematic illustration of a novel dielectric capacitor 10 formed of a dielectric-coated electrically conductive porous scaffold filled with metal according to an embodiment of the present invention. The novel dielectric capacitor 10 provides a balance between energy storage (or capacitance), breakdown voltage, thermal stability, and form factor.

The dielectric capacitor 10 is generally comprised of a porous electrically conductive scaffold 1, a conformal dielectric coating 2 formed thereon, a metal or alloy 3 at least partially filling the porous conformally coated scaffold; a pair of electrode contacts 4, and a protective cover 5. We will describe each of these components in more detail.

The scaffold 1 may be any material that is electrically conductive and has a porous structure. It forms a first electrode of capacitor 10. The term "electrically conductive" as used herein means such conductivity of at least 0.01 S/cm. Preferably, it will be more than 0.1 S/m and more preferably 1-1000 S/cm or even more. To this end, the scaffold 1 may be formed of various metals with high electrical conductivity, such as nickel (Ni), aluminum (Al), copper (Cu), tin (Sn), and/or alloys thereof, as non-limiting examples. Alternatively, the scaffold 1 may be formed of non-metal electrically conductive materials like conductive carbon (e.g., graphene) and conductive polymer matrix (e.g., polymers with electrically conductive particles like metals/alloys or conductive carbon incorporated therein).

The scaffold 1 should have "open porosity," which as used herein means that the pores are open to the ambient and can be infused with a liquid (as opposed to closed cells which are inaccessible to the environment). This permits the scaffold 1 to be filled with the metal or alloy 3 as later discussed. The open porosity may be provided by various materials providing high surface area. This can include various commercially available foam and sponge materials. Porous metal foam and sponge substrates have a high surface area intrinsically. Also, the scaffold 1 may be a woolen material (e.g., steel wool) which provides a similar open pore structure. It can also include 3D printed open pore scaffoldings. The open pores may be homogenously arranged or randomly spaced. The key parameter is that the pores provide an increased surface area to the scaffold 1 compared to a "flat" surface. And their pore distribution prevents the common problem of buzzing and delamination that arises from uniform layers common to conventional dielectric capacitors.

Many commercially available foams and sponges have open-cell scaffoldings. They can be fabricated through various means such as blowing air into the molten material as it is solidifying as one example. A sponge is considered a subset of foams that specifically have open porosity. For purposes of this disclosure, the terms open-pore foam and sponge may be used interchangeably. For instance, exemplary porous aluminum, zinc, copper and stainless steel open pore foams/sponges are available from GoodFellow Material Hub, at https://www.materialshub.com or American Elements, at https://www.americanelements.com/which may be used for scaffold 1 in some embodiments.

Surface area has a complicated relationship with porosity. There are multiple measures of high surface area substrates such as surface density (e.g., mass/area or weight/area), porosity (e.g., % of fully dense volume/weight), and surface area density, which is the area contained within a specific volume (e.g., area/volume). For many commercially available open-pore foams and sponges, the degree of porosity may be given in terms of a percentage with a pore size. A higher percentage means greater number of pores compared to the overall size and thus greater surface area. In non-limiting embodiments, the scaffold 1 may range from about 80 to 97%. The average pore diameter can be approximately 0.01-0.25 mm. However, understand there are limits. If, for instance, the porous surface area percentage is exceptional high (e.g., approaching 100%), there may be little material left for the scaffold 1 making it mechanically unsound; it could easily crack and break. Pore size or diameter values usually by themselves is not indicative of surface area of the scaffold. Yet, surface area typically increases compared to the overall volume as the pore size decreases (similar to very small particles where the surface area increases compared to volume as the diameter decreases).

Another relevant term is surface density, although, it is not necessarily specific to porous materials. It reports the ratio of the mass (or weight) to the surface area of the scaffolding material. The reciprocal ratio of surface area to mass (or weight) may also be provided in some instances giving the same information. Knowing the mass (or weight) for a given sample, effectively lets one know the surface area. These ratios may be a better criterion for characterizing and selecting a porous surface area for the scaffold 1. The uncoated porous scaffold 1 may have a surface density of about 350-1500 g/m$^2$ or more, as a non-limiting example.

The conformal dielectric coating 2 coats the scaffold 1 to make the porous surface(s) electrically insulating. It is referred to as a conformal coating since the thin film coating closely conforms to the contours of the open pores of the various surface(s) of the scaffold 1. The dielectric coating 2 may have a dielectric constant of at least 3, for instance. The dielectric constants of some glasses are around 3 and $Al_2O_3$ is approximately 5. In other preferable embodiments, coating 2 may have a dielectric constant between 20 to 400 and breakdown field up to 8 MV/cm. Although, the dielectric constant for coating 2 could go even higher, e.g., >>1,000.

The rated voltage of the capacitor 10 depends on the breakdown of the dielectric material 2 due to excess electric field, which is typically given in the units of Volts/Meter. So, if a material breaks down at 1 kV/m, then a 1 cm thick dielectric would breakdown at 10 V and the same material 1 m thick would breakdown at 1 kV. When the dielectric coating 2 gets very thin the material may break this trend and can become a bit stronger. This inverse relationship between dielectric strength and thickness works in favor of the invention because thinner films can conformally coat smaller pores without closing them off.

Some exemplary material for dielectric coating 2 may include various dielectric materials such as glasses, ceramics and refractory metal compound coatings. The dielectric coating 2 material may comprise alumina ($Al_2O_3$), zirconium oxide ($ZrO_2$), hafnia ($HfO_2$), aluminum-doped hafnia (Al:$HfO_2$), lead hafnium oxide ($PbHfO_3$ or PHO), lead zirconium oxide ($PbZrO_3$ or PZO), lead titanium oxide ($PbTiO_3$ or PTO), lead hafnate titanate ($PbHf_xTi_{1-x}O_3$ or PHT), and lead zirconate titanate ($PbZr_xTi_{1-x}O_3$ or PZT), or any combinations thereof, as non-limiting examples. Other dielectric materials may be used. As applied, the coating 2 of the dielectric material may have a conformal thickness of about 20-200 nm on the porous surface(s) of the scaffold 1.

The dielectric coating 2 may be comprised of a ferroelectric or antiferroelectric dielectric material. Ferroelectric materials have a permanent electrical polarization due to their crystalline structure in an electric field while antiferroelectric materials are in a state in which dipoles are arranged antiparallel to adjacent ones resulting in a net zero polarization at zero volts. Ferroelectric capacitors are primarily used for their voltage-tunable dielectric constant while antiferroelectrics are used for energy storage properties.

Al:$HfO_2$ can be a ferroelectric or antiferroelectric material by changing the aluminum content. For instance, the doped hafnia may be 6 at. % doped Al:$HfO_2$ as a non-limiting example of an antiferroelectric. $ZrO_2$, PHO and PZO are antiferroelectric; PTO, PHT and PZT are ferroelectric.

For example, we use the technique of atomic-layer deposition to perfectly, conformally coat the scaffold 1 including the interior surface(s) thereof. The ALD coating techniques may be the same as those discussed, for instance, in the following paper: Nicholas A. Strnad et al., "Growth of thin film ferroelectric PZT, PHT, and antiferroelectric PHO from atomic layer deposition precursors," *J Am Ceram Soc.* 2021; 104:1216-1228, available online at: https://ceramics.onlinelibrary.wiley.com/doi/full/10.1111/jace.17521, herein incorporated by reference in its entirety. The authors of that paper report ALD coatings with high dielectric constants of around 600 (See, e.g., Table 5).

Other techniques, such as chemical vapor deposition, reactive thermal treatments, or liquid-phase processing could also be used to apply the conformal coating. The dielectric material must be electrically insulating meaning it will not allow current to pass through it when there is an electric field being applied. The specifics of the dielectric, like the permittivity, thickness, and breakdown voltage determine the performance metrics for the capacitor. We have deposited dielectric material 2 in thicknesses ranging from about 20-200 nm on the porous scaffold 1 with the deposited dielectric 2 having dielectric constants from about 20 to 400 and breakdown fields up to about 8 MV/cm.

The metal or alloy 3 fills the open pores of the conformally dielectric-coated scaffold 1 (2). This creates a second, or counter electrode, for the capacitor 10. Any electrically conductive metal or alloy can be utilized for the metal or alloy 3. The melting point for the metal or alloy 3 should be less than the melting points of materials of the conformal coating 2 and the scaffold 1. For instance, the metal or alloy 3 could be aluminum or an aluminum alloy; aluminum has a melting point of 660.32° C. This requires melting the metal or alloy 3 to fill the coated scaffold 1 (2). The metal or alloy 3 can either solidify or remain a liquid.

In some embodiments, the metal or alloy 3 is preferably a liquid metal. As used herein, the term "liquid metal" means a metal or alloy which is liquid at or near room temperature (25° C.). Table I, below, gives the melting point temperature (in ° C.) for a few exemplary liquid metals and alloys that may be used for metal or alloy 3 in various embodiments. They include mercury (Hg), gallium (Ga), EGaIn (Gallium-Indium eutectic), and galinstan. The term "galinstan" refers to an eutectic alloy of gallium, indium and tin composed, for instance, of about 68.5% Ga, 21.5% In, and 10.0% Sn (by weight).

TABLE I

Melting Points of Some Liquid Metals and Alloys

| | Material | | | |
|---|---|---|---|---|
| | Mercury | Gallium | EGaIn | Galinstan |
| Melting Point (° C.) | −38.8 | 29.8 | 15.5 | −19 |

The use of a liquid metal or alloy 3 also enables a suite of new performance capabilities for the novel capacitor 10. Thermally, the liquid metal or alloy 3 can be used to cool the capacitor 10 either by flowing the metal or alloy 3 through a heat exchanger or melting the metal or alloy 3. (See FIG. 7). Also, the liquid metal or alloy 3 can be added to or retracted from the coated scaffold 1 (2) to change the capacitance of device 10. (See FIG. 8). The change in capacitance provides tuning which can be used for many radio applications where tuning is desirable or necessary.

The pair of electrode contacts 4a and 4b provides electrically conductive contacts for the capacitor 10 for connecting the device to an electrical circuit. First and second electrode contacts 4a and 4b may be formed of common electrode materials, like copper, gold or silver to name a few example materials. They may be formed of wire, as a non-limiting example. The first electrode 4a may be inserted or threaded into one or more pores of the uncoated scaffold 1 so that it makes electrical connect with that portion of the device. Alternatively, or additionally, the first electrode contact 4a may be soldered or brazed to the uncoated scaffold 1. The second electrode contact 4b needs to be in electrical contact with the filled metal or alloy 3. In some cases, the second electrode contact 4b may be integrated into the packaging or protective cover 5. Additionally, it should be appreciated that novel capacitor 10 can operate in a bi-polar fashion, meaning it can handle positive (+) or negative (−) voltages, for which conventional electrolytic capacitors cannot. Electrode contacts 4a and 4b might be dispensed with in some embodiments, such as if the capacitor 10 is directly formed or otherwise integrated into a printed circuit board.

The protective cover 5 is formed over the exterior which provides mechanical support for the capacitor 10 and prevents the capacitor 10 from electrical shorting. In the figure, the protective cover 5 is shown partially cut-away to better show the interior components. The cover 5 may be molded or casted from various dielectric or electrically insulating materials as generally known in the art for these purposes. These can include various polymers, such as plastics or rubbers, as examples. The capacitor may be dip-coated epoxies in non-limiting embodiments to form the cover 5. The outside of the protective cover 5 may be also printed with pertinent information for the capacitor 10 such as capacitance and voltage rating, as shown in the figure.

Our novel capacitor 10 has a high capacitance density (i.e., Farad/Volume) because of the porous structure of the scaffold 1. To operate the capacitor 10, one puts a voltage across it and it stores charge. The novel capacitor 10 may have a scalable capacitance of about 1μ to 1 m F and rated voltage of a few volts to about 100 volts. The high capacitance/low voltage space is particularly interesting for power conditioning applications, e.g., turning AC voltage into DC voltage for electric vehicle and personal electronics recharging circuits.

Capacitance is directly proportional to surface area of the scaffold 1. Capacitance (C) may be defined as follows:

$$C = (\varepsilon_r \varepsilon_0 A)/D, \quad (1)$$

where $\varepsilon_r$ is the dielectric constant of the dielectric coating, $\varepsilon_0$ is a constant, i.e., the permittivity of free space, A is the surface area of the scaffold, and D is the dielectric coating thickness.

The dielectric constant $\varepsilon_r$ of the conformal coating 2 material may be looked up in a textbook, such as the *Handbook of Dielectric Materials*, Miley Davis (Ed.), NY Research Press, 2018, or otherwise experimentally determined. The permittivity of free space Co is a physically constant always given as $8.85418782 \times 10^{-12}$ m$^{-3}$ kg$^{-1}$ s$^4$ A$^2$.

The equation may be rewritten in terms of surface area A for a desired capacitance C.

$$A = C D/\varepsilon_r \varepsilon_0 \quad (2)$$

Thus, one can use this equation to determine the surface area A for the porous scaffold to provide a desired capacitance C.

Figure 2:
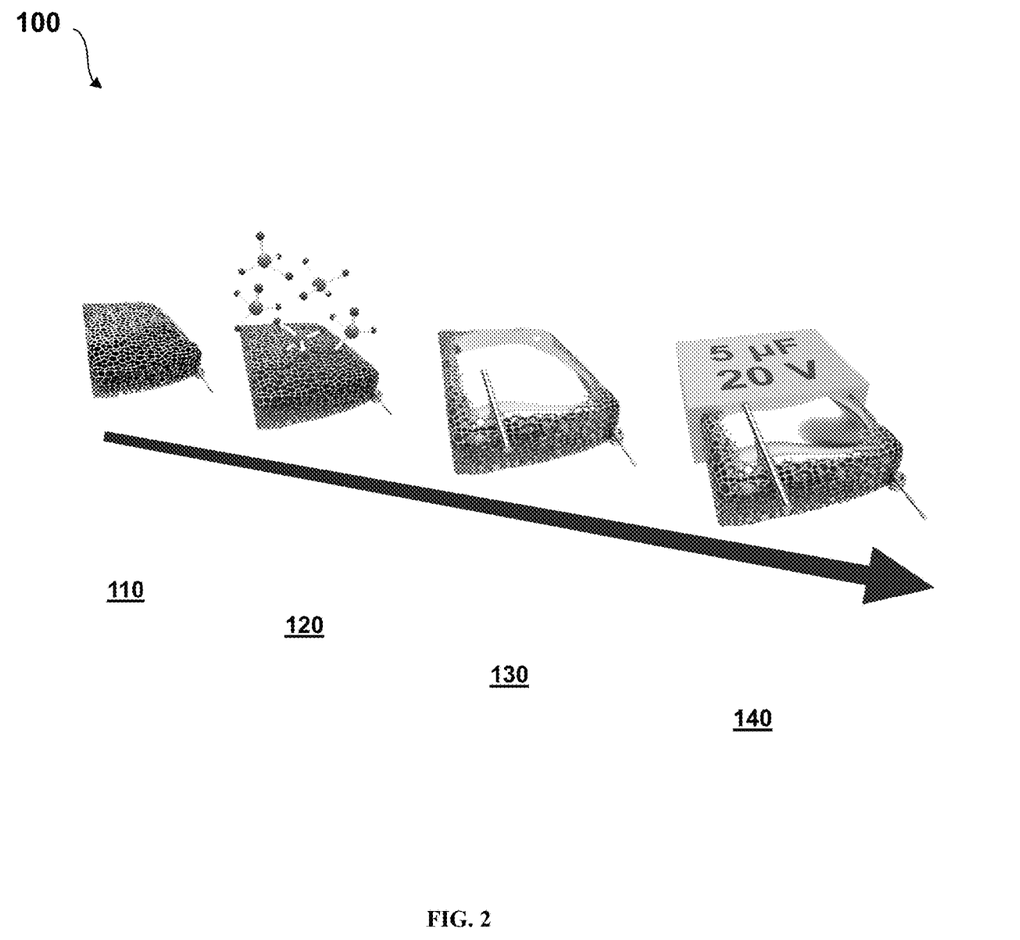
FIG. 2 is a flow chart depicting a manufacturing method for producing the novel dielectric capacitor according to embodiments.
Figure 2A:
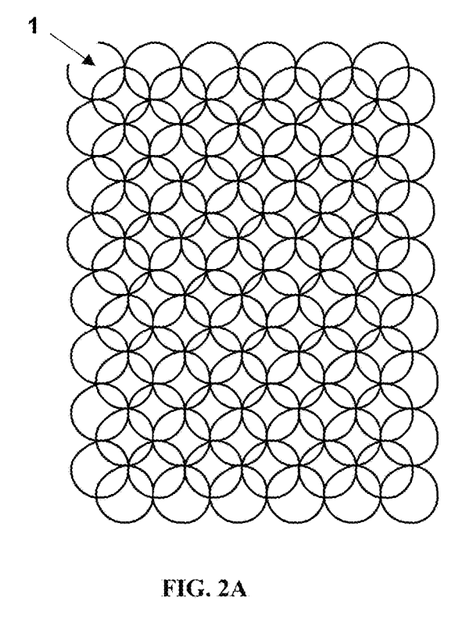
FIGS. 2A-2F show the structure of the novel capacitor as it is being fabricated following the steps of the method.
Figure 2B:
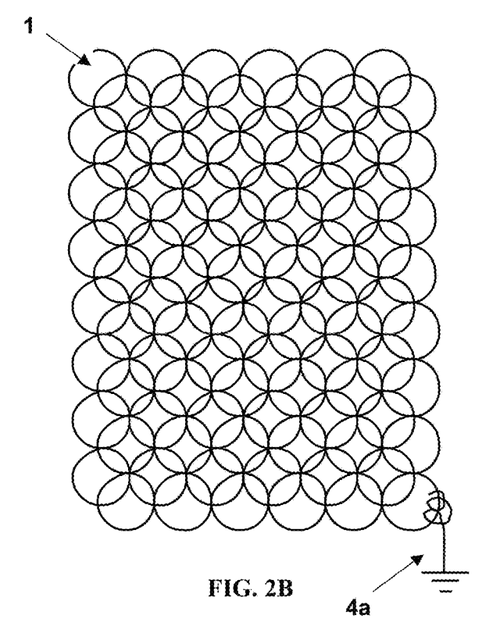

FIG. 2 is a flow chart depicting the manufacturing method 100 for producing the novel dielectric capacitor 10 according to embodiments. FIGS. 2A-2F show the structure of the novel capacitor being fabricated in more detail following steps of method 100.

In step 110 in FIG. 2, the scaffold 1 is provided/formed and initially processed. The scaffold 1 is supplied as or formed and cut to size. It may be laser cut, for instance. Once to desired size, the scaffold 1 is cleaned. For instance, cleaning may include solvent cleaning including ultrasonic baths of acetone, methanol, and isopropanol, and additionally or alternatively, an oxygen plasma cleaning which prepares the surface for coating 2 growth. An illustration of the resultant scaffold structure is illustratively depicted in FIG. 2A. As further shown in FIG. 2B, the first electrode contact 4a is then attached to the scaffold 1, by threading, soldering, brazing, etc.

Figure 2C:
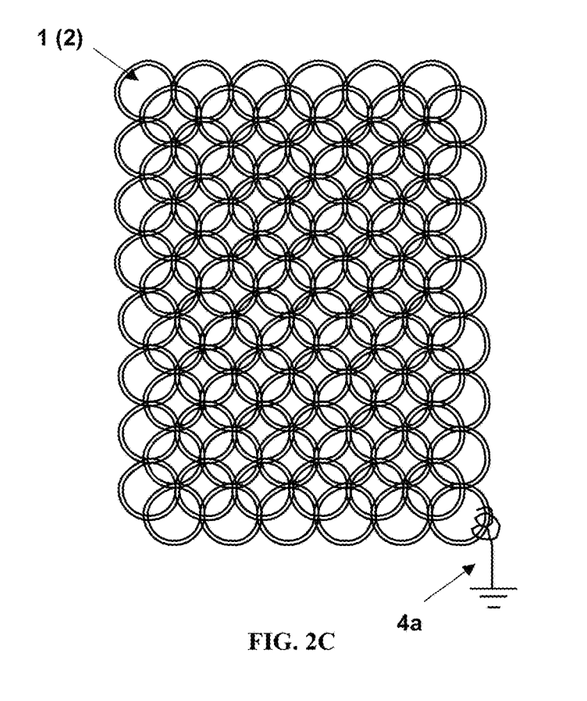

Next, in step 120 in FIG. 2 and as further depicted in FIG. 2C, the scaffold 1 is conformally coated with dielectric material 2. As discussed above, the coating 2 is conformally coating on the entirety of the surface(s) of the scaffold 1. This conformally coating of the dielectric material 2 may be achieved by atomic layer deposition (ALD), chemical vapor deposition (CVD), reactive thermal treatments, or liquid-phase processing, for instance. After coating, the dielectric-coated scaffold 1 (2) may be subject to annealing, such as at a temperature of at least 500° C. in $N_2$ for about 1 minute.

Next, in step 130 in FIG. 2, the scaffold 1 which is scaffold conformally coated with dielectric material 2 is at least partially filled with the metal or alloy 3. The metal or alloy 3 needs to be liquid This may require melting it if it has a melting point above room temperature. If the metal or alloy 3 is a liquid metal, no additional heating is required. The metal or alloy 3, in liquid state, is poured into the coated scaffold 1 (2). We have found that it is difficult to get the metal or alloy 3 to go the inside the coated porous scaffold 1 (2). This is due to the high surface tension of metal as a liquid.

Figure 2D:
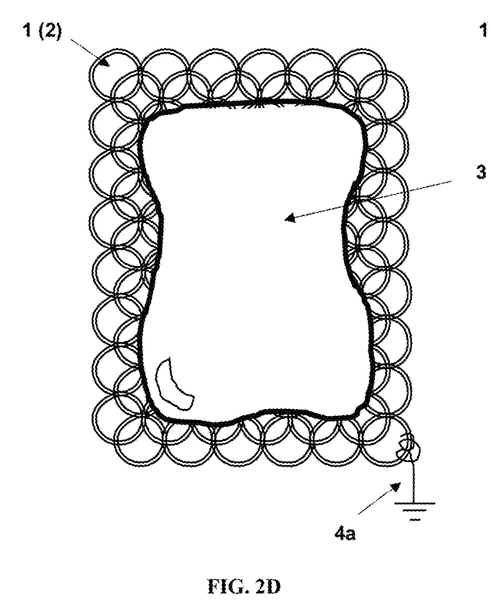
Figure 2E:
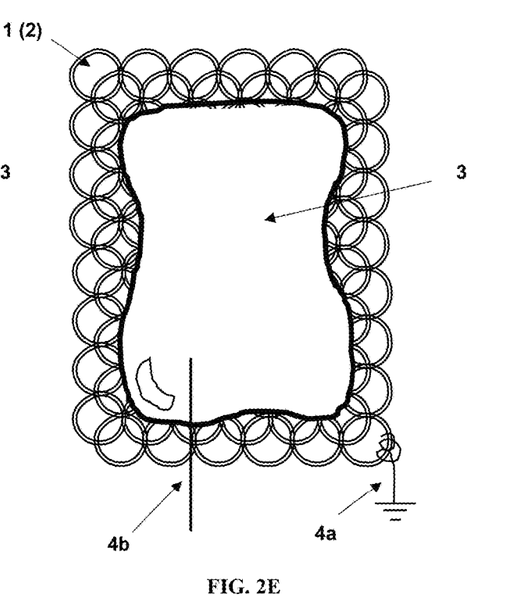

Thus, a pressure gradient may be needed to force or push the liquid through and into the porous structure of the scaffold. For instance, a centrifuge can be used to create the pressure gradient. Alternatively, it is possible to submerge the coated scaffold 1 (2) in a bath of liquefied or liquid metal or alloy 3; agitation may further improve infusing. The resultant metal or alloy-filled structure is depicted in FIG. 2D. Afterwards, as illustrated in FIG. 2E, the second electrode 4b is connected to the metal or alloy 3.

Figure 2F:
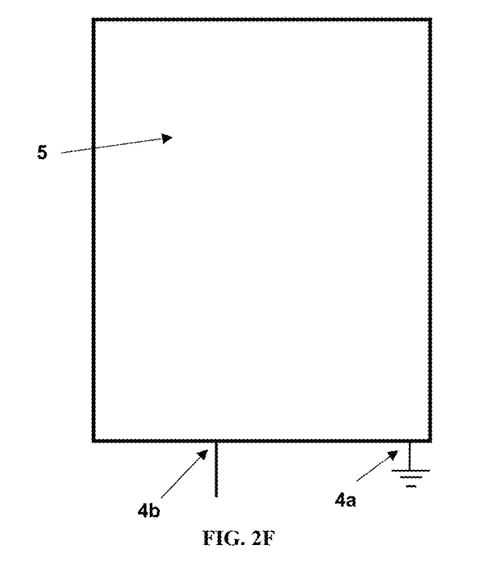

Next, in step 140 in FIG. 2, and depicted in FIG. 2F, the protective cover 5 is formed over the exterior. The cover 5 may be molded, casted or dip-coated from various dielectric or electrically insulating materials as generally known in the art for these purposes. The external surface of the cover 5 may be printed with information, such as the capacitance and voltage rating.

EXAMPLES

We built and tested various novel dielectric capacitors formed of a nickel foam bottom electrode that has been conformally coated with dielectric hafnia.

To start, we used a commercially available 1.6 mm thick nickel foam substrate available from MTI crystals (more information on this product is available online at: http://www.mtixtl.com/NickelFoamforBatteryCathode Substrate1mlengthx300mmwidthx1.6mm.aspx, this webpage herein incorporated by reference in its entirety). As stock, it is supplied in a panel which is 1000 mm length×300 mm width. That foam is about ≥95% porous with pore diameters of ~0.25 mm. It has a reported surface density of about 346 g/m$^2$. Capacitor fabrication begins by cutting to size followed by solvent and oxygen plasma cleaning. Next, we conformally coated the nickel foam with either $HfO_2$ or antiferroelectric-like Al:HfO$_2$ coating applied by an ALD process from suitable ALD precursors.

The precursors used were tetrakis dimethylamino hafnium (TDMAH) and trimethylaluminum (TMA) with H$_2$O as the oxygen precursor. The inert purge gas was Ar. The substrate temperature during growth was held at 250° C. The composition of the film was varied by changing the ratio of HfO$_2$ cycles to Al$_2$O$_3$ cycles ranging from 24:1 for 4 at. % to 23:2 for 8 at. %. The total number of cycles defined the film thickness. More information on the process may be found in the following paper: Alexis Payne et al., "Dielectric, energy storage, and loss study of antiferroelectric-like Al-doped HfO$_2$ thin films," Appl. Phys. Lett. 117, 221104 (2020), herein incorporated by reference in its entirety. The coating thickness ranged from 20-70 nm on surface(s) of the nickel foam. After coating, the foams were annealed at 500° C. in a nitrogen (N$_2$) environment for 60 s.

They were then infused the Al:HfO$_2$-coated foams with a liquid metal forming the counter electrode. We filled the coated foam with approximately 0.7 grams of either Ga—In eutectic alloy or pure gallium. The final size of the capacitor was about 25×25×2 mm.

Figure 3:
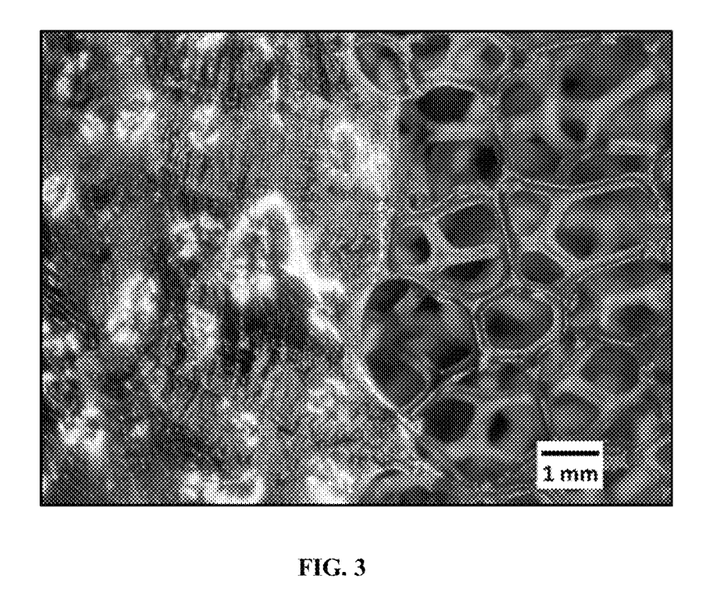
FIG. 3 is a magnified optical image of one 6 at. % doped Al:HfO$_2$-coated Ni metal foam with liquid gallium metal that we prepared.

FIG. 3 is a magnified optical image of one 6 at. % doped Al:HfO$_2$-coated Ni metal foam with liquid gallium metal that we prepared. Transmission electron microscopy shows the films of Al:HfO$_2$ coated on the foam is crystalline. This novel capacitor structure and geometry provide an exciting opportunity to transition recent developments in ALD ferroelectrics to a cheaper, more robust platform, taking advantage of their high energy density, breakdown strength, and other exotic dielectric properties.

Filled and unfilled coated foams were then tested as discussed below.

Figure 4:
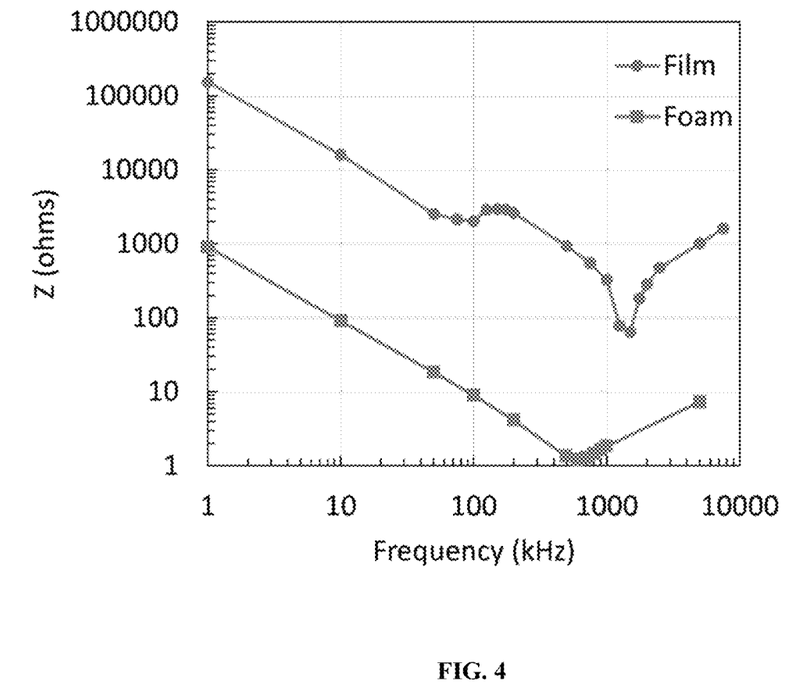
FIG. 4 is a plot comparing measured impedance over various frequencies for the 6 at. % doped Al:HfO$_2$-coated Ni metal foam compared to a conventional dielectric film.

FIG. 4 is a plot comparing measured impedance over various frequencies for an ALD coated porous metal foam ("Foam") compared to a conventional dielectric film ("Film"). The testing was performed using an HP impedance analyzer.

The coated metal foam was annealed 6 at. % doped Al:HfO$_2$ ALD deposited on a porous Ni foam as discussed above. No metal or alloy 3 was filled in the foam scaffold for this test. The "Film" control was a 50 nm Al:HfO$_2$ grown with the same conditions on a cleanroom-fabricated high surface area electrode. The film electrodes were 100 nm thick platinum on both sides. The high surface area was accomplished by etching deep trenches into a silicon wafer and then coating it as follows: Pt/AlHfO$_2$/Pt. This is the standard for a high-surface area capacitors made in the cleanroom.

As will be appreciated, while the two samples showed a similar trend across the frequencies tested, the ALD coated metal foam has a much lower impedance than the conventional film. This is due to the much higher porosity of the foam compared to the film control. Heating from stray currents is no longer a problem because the liquid metal electrode provides excellent thermal performance. Thermal management of electronics plagues from pulsed power. We have demonstrated their performance in the lab.

Figure 5:
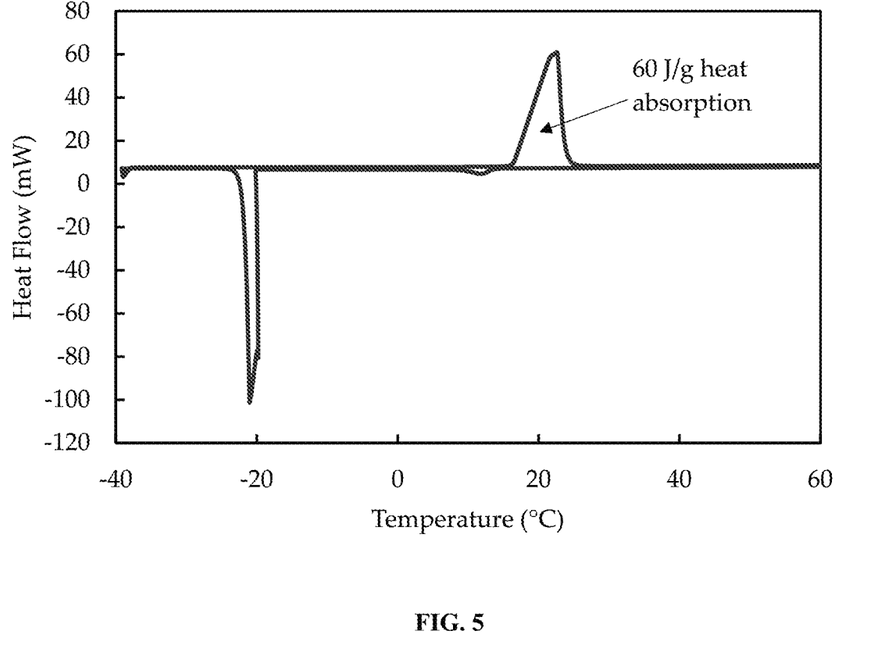
FIG. 5 is a plot showing of heat flow over various temperatures for the 6 at. % Al:HfO$_2$ deposited on porous Ni foam filled with liquid gallium metal.

FIG. 5 is a plot showing of heat flow over various temperatures for the annealed 6 at. % Al:HfO$_2$ deposited on porous Ni foam filled with liquid gallium metal. The key take away from this plot is that the liquid metal counter electrode could be melted to absorb heat. That means that the capacitor can absorb 60 J/g of heat around 20° C. without changing its temperature. (Note: this is like boiling water—you put in heat to get it to 100° C. then one must put in a lot more heat to change it from liquid to vapor but all the while the temperature stays at 100° C. The negative spike near −20° C. is the opposite effect; that is, the energy that is absorbed going from liquid to solid phase (freezing).).

Figure 6:
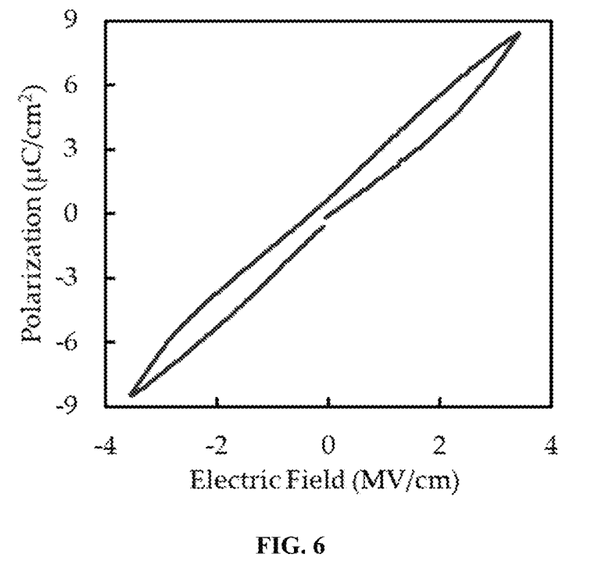
FIG. 6 is a plot showing material polarization versus electric field for 6 at. % doped Al:HfO$_2$ deposited on Ni foam and annealed.

FIG. 6 is a plot showing material polarization versus electric field (same as applied voltage) for 6 at. % doped Al:HfO$_2$ deposited on Ni foam and annealed. No metal or alloy 3 was filled in the foam scaffold 1 for this analysis. The testing was performed using a Radiant Ferroelectric tester coupled to a custom probing set-up with liquid metal routing. Charge versus electric field curves show the slim, non-linear response.

The slope of the plot correlates to the dielectric constant. The shape of this curve confirms that the dielectric grown on the foam has similar properties to ones grown on more conventional dielectric substrates. The polarization hysteresis for the annealed 6 at. % doped Al:HfO$_2$ deposited on the open-pore Ni foam shows an antiferroelectric (AFE)-like response. In particular, it shows non-linearity in the dielectric constant consistent around 2 MV/cm. This is generally expected for an antiferroelectric material as evidenced by the state of the art in terms of atomic layer deposited dielectrics. See, for instance, the following paper: Alexis Leilani Payne, "A Characterization Platform for 3D Ferroelectric Thin Films," PhD Dissertation, Material Science and Engineering, North Carolina State University (NCSU), 2021, available online at: https://repository.lib.ncsu.edu/bitstream/handle/1840.20/39059/etd.pdf, herein incorporated by reference in its entirety (see FIGS. 5, 6, and 7B in particular).

Figure 7:
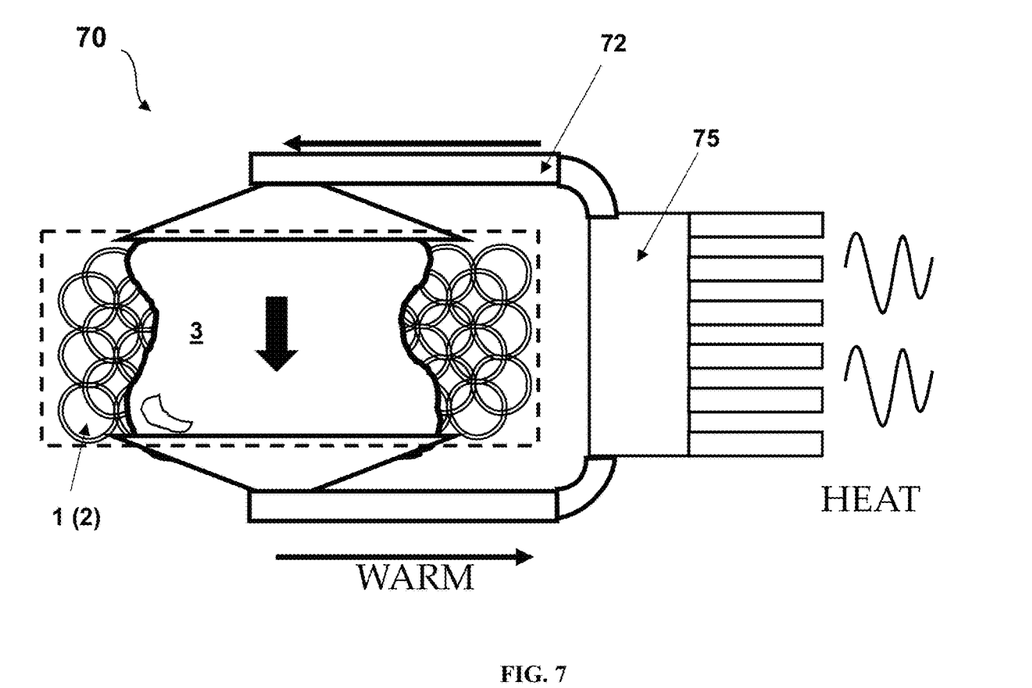
FIG. 7 depicts a coolable dielectric capacitor according to an embodiment.

FIG. 7 depicts a coolable dielectric capacitor 70 according to an embodiment. It is configured as a heat exchanger. The capacitor portion is delineated by the dotted line in the figure. Many of the components are the same as capacitor 10 in FIG. 1 and have the same numbering, although, electrode contacts 4a and 4b as well as the protective cover 5 are not shown here.

Inefficiencies within the capacitor causes it to self-heat, which is a major cause of device failure. One way to mitigate this is to flow a coolant around the capacitor as is conventional. However, by using with a liquid metal or alloy 3, it can be used like a coolant. The liquid metal or alloy 3 is extremely efficient at taking heat away from the capacitor. The metal or alloy 3 flows from the capacitor portion in a conduit 72 to a heat exchanger 75 to discharge heat to the environment and then the metal or alloy 3 flows back to the capacitor portion. Heat exchanger 75 is shown as a simple finned heat sink in the figure. However, it should be appreciated that other types of heat exchangers can be used in other embodiments. For better flow of the metal or alloy 3, a pump (not shown) could be further included in the conduit 72 flow loop.

Figure 8:
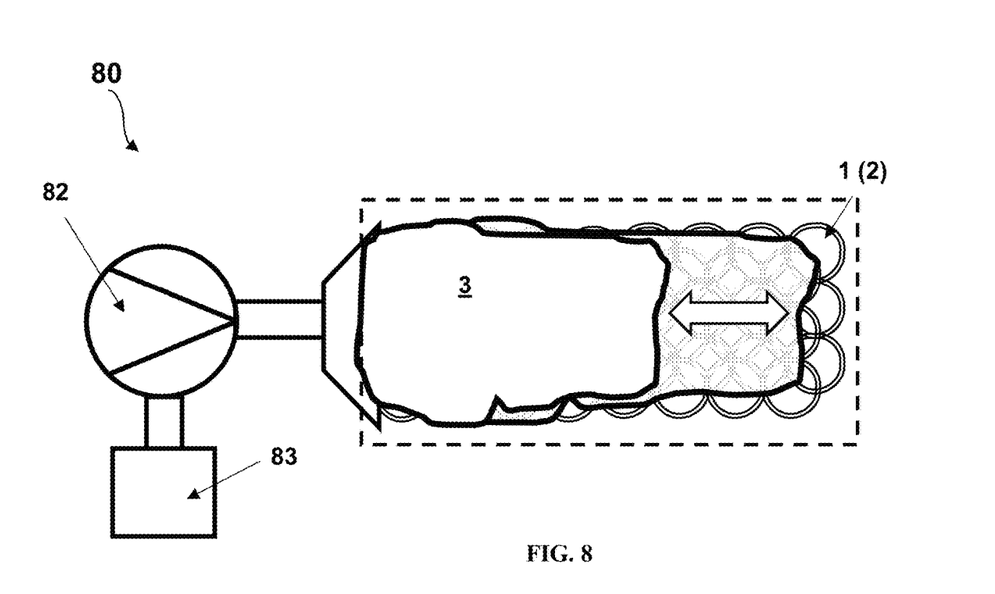
FIG. 8 depicts a tunable dielectric capacitor according to another embodiment.

FIG. 8 depicts a tunable dielectric capacitor 80 according to another embodiment. The capacitor portion is delineated by the dotted line in the figure. Many of the components are the same as capacitor 10 in FIG. 1 and have the same numbering, although, electrode contacts 4a and 4b as well as the protective cover 5 are not shown here. A pump 82 can pump liquid or melted metal or alloy 3 into and out of the capacitor enabling the volume of metal or alloy 3 within the dielectric coated porous scaffold 1 (2) to change, thus changing the capacitance of the capacitor. This makes the device a varactor (variable capacitor). With the pump 82, the entire volume of the dielectric coated porous scaffold 1 (2) may be filled with metal or alloy 3 or nearly emptied, or somewhere in between. Since many circuits use resonance, which depends on inductance, capacitance, and resistance, changing the capacitance helps tune the circuit. Excess metal or alloy 3 can be pumped into and out of a reservoir 83 for storage. A heating unit (not shown) might be further incorporated into the device to melt and liquefy metal and alloys with melting points above room temperature.

The unique structure and geometry of the novel capacitor embodiment discussed herein provide interesting benefits namely: high capacitance density arising from the high surface area, unique pulsed-power handling capability owing to the ability for the metal to melt in situ at low temperatures, flexibility, and potentially more exotic sensing properties.

Aspects of this invention had been previous disclosed in a presentation tilted "A Capacitor Consisting of Metal Foam, ALD-Dielectric, and Liquid Metal" given by inventor Dr. Brendan Hanrahan at the 2022 International Symposium on Applications of Ferroelectrics (ISAF) in Tours, France on Jun. 29, 2022. A video of presentation posted on YouTube at: https://www.youtube.com/watch?v=BigdBm3InNg on Jul. 11, 2022. The presentation and video are incorporated by reference in their entireties.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, and to describe the actual partial implementation in the laboratory of the system which was assembled using a combination of existing equipment and equipment that could be readily obtained by the inventors, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

We claim:

1. A dielectric capacitor comprising:
an electrically conductive porous scaffold forming a first electrode conformally coated with a dielectric material; and
a metal or metal alloy at least partially filling porous space within the electrically conductive porous scaffold coated with the dielectric material forming a second electrode,
wherein the metal or metal alloy has a melting temperature corresponding to the operating temperature of the dielectric capacitor to prevent overheating of the capacitor.

2. The capacitor of claim 1, wherein the electrically conductive porous scaffold comprises an open pore foam, sponge, woolen material, or 3D printed open pore scaffolding.

3. The capacitor of claim 1, wherein the uncoated electrically conductive porous scaffold has a porosity of about 80% or more and an average pore size of approximately 0.01-0.25 mm.

4. The capacitor of claim 1, wherein the uncoated electrically conductive porous scaffold has a surface density of about 350-1500 g/m$^2$.

5. The capacitor of claim 1, wherein the uncoated electrically conductive porous scaffold comprises nickel (Ni), aluminum (Al), copper (Cu) or carbon (C).

6. The capacitor of claim 1, wherein the dielectric material comprises an antiferroelectric dielectric material.

7. The capacitor of claim 6, wherein the antiferroelectric dielectric material comprises zirconium oxide ($ZrO_2$), aluminum-doped hafnia ($Al:HfO_2$), lead hafnium oxide ($PbHfO_3$), lead zirconium oxide ($PbZrO_3$), or any combinations thereof.

8. The capacitor of claim 1, wherein the dielectric material has a conformal thickness of about 20-200 nm on the electrically conductive porous scaffold.

9. The capacitor of claim 1, wherein the coated dielectric material has a dielectric constant between about 20 to 400 and breakdown field up to about 8 MV/cm.

10. The capacitor of claim 1, wherein the metal or metal alloy is liquid at room temperature (25° C.).

11. The capacitor of claim 10, wherein the metal comprises a liquid eutectic metal.

12. The capacitor of claim 10, wherein the liquid eutectic metal comprises mercury, gallium, EGaIn or galinstan.

13. The capacitor of claim 1, further comprising: a protective cover.

14. The capacitor of claim 1, wherein the capacitance is between 1μ to 1 m F and the rated voltage of a few volts to about 100 volts.

15. The capacitor of claim 1, wherein the capacitor is configured as a bi-polar dielectric capacitor.

16. The capacitor of claim 1, further comprising: a heat exchanger in connection and/or contact with the metal or alloy.

17. The capacitor of claim 1, further comprising: a pump for removing metal or alloy from and/or adding metal or alloy to the electrically conductive porous scaffold.

18. A dielectric capacitor comprising:
an electrically conductive open pore porous metal foam scaffold;
a dielectric metal conformally coated on the surface of the porous metal foam scaffold; and
a liquid metal or alloy at least partially filling the porous space of the dielectric-coated foam scaffold,
wherein the metal or metal alloy has a melting temperature at a temperature just above the operating temperature of the dielectric capacitor where the capacitor will overheat.

19. A method for forming the dielectric capacitor of claim 1, the method comprising:
providing or forming an electrically conductive porous scaffold;
conformally coating the electrically conductive porous scaffold with a dielectric material; and
filling at least a portion of the porous space of the dielectric-coated porous scaffold with a metal or metal alloy.

20. The method of claim 19, further comprising: cleaning the porous scaffold before coating it with the dielectric material.

21. The method of claim 19, wherein conformally coating the porous scaffold with a dielectric material comprises: atomic layer deposition (ALD), chemical vapor deposition (CVD), reactive thermal treatments, or liquid-phase processing.

22. The method of claim 19, further comprising: annealing the dielectric-coated porous scaffold at temperature of at least 500° C. in $N_2$ for about 1 minute.

23. The method of claim 19, wherein filling at least a portion of the porous space of the dielectric-coated porous scaffold with the liquid metal or alloys comprises using a centrifuge or by submersion in a metal bath.

24. The method of claim 23, further comprising:
connecting a first electrode contact to the electrically conductive porous scaffold before it is conformally coated with the dielectric material; and
connecting a second electrode contact to the metal or alloy at least partially filling the porous space of the dielectric coated porous scaffold.

\* \* \* \* \*